United States Patent
Yeom et al.

(10) Patent No.: US 11,046,355 B2
(45) Date of Patent: Jun. 29, 2021

(54) STEERING CONTROL APPARATUS

(71) Applicant: MANDO CORPORATION, Pyeongtaek-si (KR)

(72) Inventors: SeulKi Yeom, Seoul (KR); Jung Sik Park, Seongnam-si (KR)

(73) Assignee: MANDO CORPORATION, Pyeongtaek-si (KR)

(*) Notice: Subject to any disclaimer, the term of this patent is extended or adjusted under 35 U.S.C. 154(b) by 143 days.

(21) Appl. No.: 16/550,930

(22) Filed: Aug. 26, 2019

(65) Prior Publication Data
US 2020/0062293 A1    Feb. 27, 2020

(30) Foreign Application Priority Data
Aug. 27, 2018   (KR) .................. 10-2018-0100183

(51) Int. Cl.
| B62D 5/00 | (2006.01) |
| B62D 15/02 | (2006.01) |
| B62D 6/00 | (2006.01) |

(52) U.S. Cl.
CPC ............. B62D 5/005 (2013.01); B62D 6/008 (2013.01); B62D 15/021 (2013.01)

(58) Field of Classification Search
CPC . B62D 5/00; B62D 5/005; B62D 6/00; B62D 6/008; B62D 15/02; B62D 15/021
See application file for complete search history.

(56) References Cited

U.S. PATENT DOCUMENTS

| 2005/0205340 A1* | 9/2005 | Shimoyama .......... F16H 37/022 |
| | | 180/444 |
| 2016/0368529 A1* | 12/2016 | Shiina .................... B62D 5/043 |
| 2017/0210411 A1* | 7/2017 | Kogure ................ B62D 5/0403 |

FOREIGN PATENT DOCUMENTS

| JP | 07-081601 A | 3/1995 |
| JP | 2004-338501 A | 12/2004 |
| JP | 2007-106139 A | 4/2007 |
| JP | 2010-173592 A | 8/2010 |
| KR | 10-1509802 B1 | 4/2015 |
| KR | 10-1836744 B1 | 3/2018 |

OTHER PUBLICATIONS

Korean Office Action dated Aug. 13, 2019 in connection with counterpart Korean Patent Application No. 10-2018-0100183, citing the above references.

* cited by examiner

*Primary Examiner* — Tan Q Nguyen
(74) *Attorney, Agent, or Firm* — Hauptman Ham, LLP (57) ABSTRACT

The present disclosure provides a steering control apparatus including: a steering wheel; a column including a column shaft and a worm wheel reduction gear; a reactive force generator including a worm shaft, a coupling bearing, and a reaction motor; a solenoid including a rod that can be coupled with a second coupling groove of the coupling bearing and a housing connected to the rod; and a controller that checks a state of a vehicle and outputs a turn-off signal performing control such that the rod protrudes to the outside of the housing and is coupled with the second coupling grooves of the coupling bearing or a turn-on signal performing control such that the rod enters the inside of the housing and is decoupled from the second coupling grooves of the coupling bearing based on a result of checking.

12 Claims, 8 Drawing Sheets

STEERING CONTROL APPARATUS

CROSS-REFERENCE TO RELATED APPLICATION

This application claims priority from Korean Patent Application No. 10-2018-0100183, filed on Aug. 27, 2018, which is hereby incorporated by reference for all purposes as if fully set forth herein.

BACKGROUND OF THE INVENTION

Field of the Invention

The present disclosure relates to a steering control apparatus.

Description of Related Art

As steering systems of vehicles, there are a hydraulic steering system in which a vehicle is steered by generating a hydraulic pressure by operating a pump and a motor-driven steering system in which a vehicle is steered using a motor.

In a steering system of a vehicle, it is required to provide an appropriate reactive sense according to a traveling situation such that a driver feels a steering sense for a steering operation of the vehicle according to rotation of a steering wheel when the driver holds and rotates the steering wheel.

Such a reactive sense can be provided by a reaction motor connected to the steering wheel through a column and the like.

For example, the reaction motor may generate a reactive torque for the rotation of the steering wheel and provide a reactive sense for a driver under the control of a controller.

In a case in which a steering system of a vehicle abnormally operates, a driver needs to receive a stronger reactive sense than that of a normal time such that the driver has no sense of difference for a steering operation of the vehicle according to the rotation of the steering wheel.

Accordingly, in order to provide a sufficient reactive sense for a driver also in preparation of a case in which a steering system of a vehicle abnormally operates, the size and the capacity of a reaction motor necessarily become large, and a steering control apparatus including the reaction motor of which the size and the capacity become large increases in size as well, and there is a difficulty in decreasing the weight of the vehicle.

SUMMARY OF THE INVENTION

In such a background, an objective of the present disclosure is to provide a steering control apparatus capable of providing a sufficient reactive sense for a driver without increasing the size and the capacity of a reaction motor.

Another objective of the present disclosure is to provide a steering control apparatus enabling a light weight of a vehicle by decreasing the size and the capacity of a reaction motor.

Yet another objective of the present disclosure is to provide a steering control apparatus performing control such that a driver is prevented from unstably operating a steering wheel for an abnormal steering system of a vehicle.

In order to achieve the object described above, in one aspect, the present disclosure provides a steering control apparatus including: a steering wheel; a column including a column shaft, which is in the form of a shaft, having one end with which the steering wheel is coupled and a worm wheel reduction gear that is coupled with the other end of the worm shaft and include one or more first coupling grooves; a reactive force generator that includes a worm shaft engaged with the first coupling grooves of the worm wheel reduction gear, a coupling bearing coupled with one end of the worm shaft and including one or more second coupling grooves, and a reaction motor coupled with the other end of the worm shaft and generating a reactive torque for rotation of the steering wheel; a solenoid including a rod that can be coupled with the second coupling grooves of the coupling bearing and a housing that is connected to the rod; and a controller that checks a state of a vehicle and outputs a turn-off signal performing control such that the rod protrudes to the outside of the housing and is coupled with the second coupling grooves of the coupling bearing or a turn-on signal performing control such that the rod enters the inside of the housing and is decoupled from the second coupling grooves of the coupling bearing based on a result of checking.

In another aspect, the present disclosure provides a steering control apparatus including: a steering wheel; a column shaft, which is in the form of a shaft, having one end with which the steering wheel is coupled; a reactive force generator including a coupling bearing that is coupled with the other end of the column shaft and includes one or more coupling grooves and a reaction motor that is coupled with the other end of the column shaft extending through the coupling bearing and generates a reactive torque for rotation of the steering wheel; a solenoid including a rod that can be coupled with the coupling groove of the coupling bearing and a housing connected to the rod; and a controller that checks a state of a vehicle and outputs a turn-off signal performing control such that the rod protrudes to the outside of the housing and is coupled with the coupling groove of the coupling bearing or a turn-on signal performing control such that the rod enters the inside of the housing and is decoupled from the coupling groove of the coupling bearing.

As described above, according to the present disclosure, a steering control apparatus capable of providing a sufficient reactive sense for a driver without increasing the size and the capacity of a reaction motor can be provided.

In addition, according to the present disclosure, a steering control apparatus enabling a light weight of a vehicle by decreasing the size and the capacity of a reaction motor can be provided.

Furthermore, according to the present disclosure, a steering control apparatus performing control such that a driver is prevented from unstably operating a steering wheel for an abnormal steering system of a vehicle can be provided.

DETAILED DESCRIPTION OF THE INVENTION

In the following description of examples or embodiments of the present disclosure, such as "first", "second", "A", "B", "(A)", or "(B)" may be used herein to describe elements of the disclosure. When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

Figure 1:
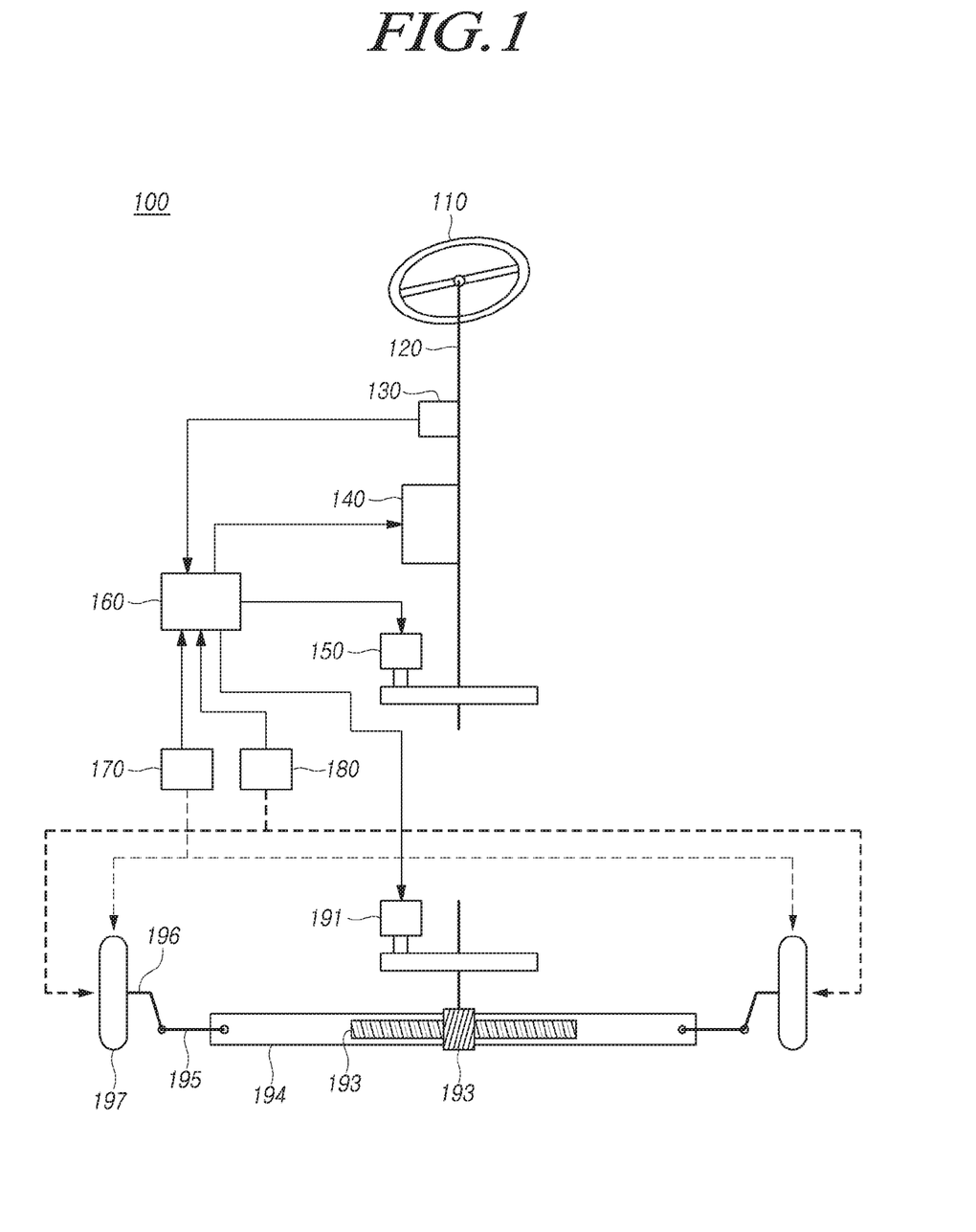
FIG. 1 is a diagram illustrating a steering system of a vehicle according to the present disclosure.

FIG. 1 is a diagram illustrating a steering system 100 of a vehicle according to the present disclosure.

The steering system may be either a mechanical steering system in which wheels are steered by transmitting a force generated by a driver rotating a steering wheel to an actuator and the like of the wheels through a mechanical power transmission apparatus or a steer-by-wire (SBW) steering system in which a mechanical power transmission apparatus is removed.

The SBW steering system represents a system in which an electronic control unit (ECU) receives information relating to a torque generated in accordance with the rotation of a steering wheel, the ECU outputs a control signal, and the control signal is transmitted to an actuator and the like of wheels, whereby the wheels are steered.

In description presented here, for the convenience of description, it is assumed that the steering system 100 of a vehicle according to the present disclosure is a steer-by-wire steering system.

However, the steering system is not limited thereto.

Referring to FIG. 1, the steering system 100 of a vehicle according to the present disclosure may include: a steering wheel 110; a column 120 that is longitudinally formed in an axial direction; a steering angle sensor 130 that is used for detecting a steering angle of the steering wheel 110; a solenoid 140 that stops the rotation of the steering wheel 110 and the column 120 under the control of a controller 160; a reaction motor 150 that provides a reactive torque for the rotation of the steering wheel 110; a steering wheel angle sensor 170 that detects a steering wheel angle of wheels 197 according to the steering of the steering wheel 110; a rotation speed sensor 180 that detects a rotation speed of the wheels 197; the controller 160 that receives electric signals from various sensors and controls the solenoid 140, the reaction motor 150, a drive motor 191, and the like; and the like.

The steering wheel 110 represents a part that is directly held and steered by a driver using the hands.

The form of the steering wheel 110 may be a circular shape but is not limited thereto.

The column 120 is coupled with the steering wheel 110.

The form of the column 120 may be a cylindrical shape but is not limited thereto.

The column 120 may perform a telescopic operation of extending or contracting in an axial direction in accordance with a driver or a setting of the controller 160.

The steering angle sensor 130 detects a steering angle of the steering wheel 110 and thereafter transmits an electric signal corresponding to a detected value (or steering angle information) to the controller 160.

Here, the steering angle of the steering wheel 110 represents a rotation angle of the steering wheel 110.

A position of the steering angle sensor 130 may be arbitrary arranged.

For example, as illustrated in FIG. 1, the steering angle sensor 130 may be arranged at one end of the column 120.

The solenoid 140 operates to disable rotation of the steering wheel 110 in one direction by blocking the rotation of the column 120 or the reaction motor 150 in accordance with a control signal transmitted from the controller 160.

The form of the solenoid 140 may be designed to be a cylindrical shape such that another member can be included on the inside thereof.

However, the form of the solenoid 140 is not limited thereto.

A specific structure and an operating appearance of the solenoid 140 will be described later with reference to FIG. 5.

The reaction motor 150 receives a control signal from the controller 160, generates a reactive torque for the rotation of the steering wheel 110, and provides a reactive sense for a driver.

The controller 160 checks a state of the vehicle and outputs a control signal used for controlling the solenoid 140 based on a result of the checking.

The controller 160 may be an electronic control unit (ECU) for realizing a system controlling the steering of the vehicle.

However, the controller 160 is not limited thereto.

The controller 160 receives electric signals from various sensors such as the steering angle sensor 130, the steering wheel angle sensor 170, and the rotation speed sensor 180 and transmits control signals such that components and devices controlling steering of the vehicle are operated.

The steering wheel angle sensor 170 detects a steering wheel angle of the wheels 197 according to the steering of the steering wheel 110 and transmits an electric signal corresponding to a detected value (or steering wheel angle information) to the controller 160.

The steering wheel angle sensor 170 may be separately arranged on the periphery of the controller 160 as illustrated in FIG. 1 or may be arranged at one end of the column 120 together with the steering angle sensor 130 illustrated in FIG. 1.

Here, the steering wheel angle of the wheels 197 represents an angle at which the wheels 197 move to the left side or the right side with respect to the positions of the wheels 197 at the time of traveling straight of the vehicle.

The rotation speed sensor 180 detects a rotation speed of the wheels 197 and thereafter transmits an electric signal corresponding to a detected value to the controller 160.

Here, the rotation speed of the wheels 197 may be in correspondence with a speed of the vehicle.

Although not illustrated in FIG. 1, a torque sensor that is used for detecting a steering torque of the column 120, a reactive torque, and a torque according to the rotation of the steering wheel 110, and the like, a lateral acceleration sensor, a yaw rate sensor, and the like may be additionally included.

Here, the steering system 100 of a vehicle according to the present disclosure may further include: a drive motor 191 that operates in accordance with a control signal transmitted from the controller 160, a pinion gear 192 that rotates in accordance with an operation of the drive motor 191; a rack bar 194 that includes a rack gear 193 engaged with the pinion gear 192; a tie rod 195 coupled with the rack bar 194; a knuckle arm 196; and wheels 197.

Although not illustrated in FIG. 1, the steering system 100 of a vehicle according to the present disclosure may further include an actuator coupled with the tie rod 195 and the knuckle arm 196.

The actuator (not illustrated in the drawing) may receive a control signal from the controller 160 and change the advancement direction of the wheels 197.

Here, the steering control apparatus included in the steering system 100 of a vehicle according to the present disclosure may have various structures by differently coupling the steering wheel 110, the column 120, the solenoid 140, and the like.

Hereinafter, an example of the structure of the steering control apparatus will be described.

Figure 2:
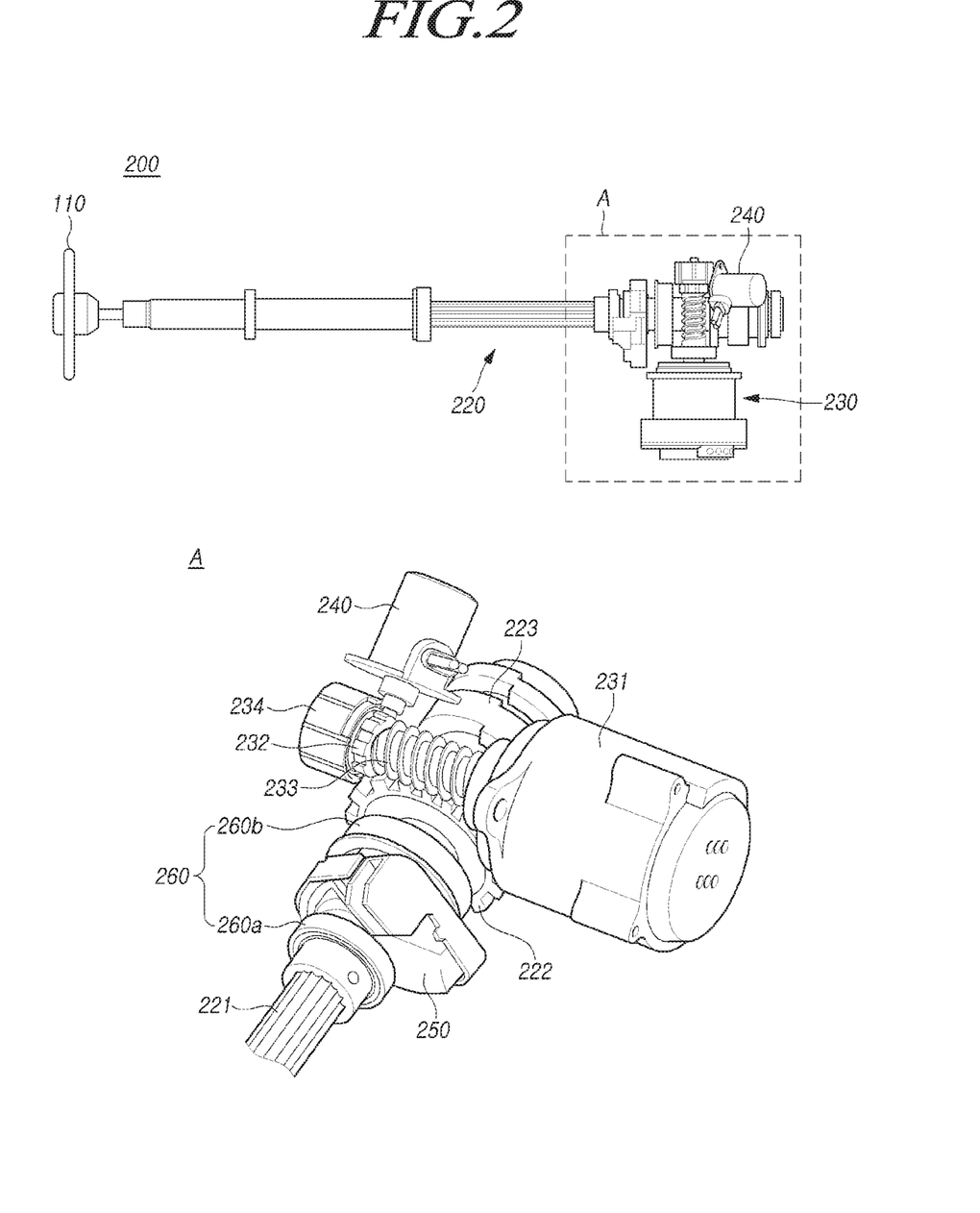
FIG. 2 is a diagram illustrating the structure of a steering control apparatus according to a first embodiment of the present disclosure.

FIG. 2 is a diagram illustrating the structure of a steering control apparatus 200 according to a first embodiment of the present disclosure.

Referring to FIG. 2, the steering control apparatus 200 according to the present disclosure may include: a steering wheel 110; a column 220 that has a columnar shape as a whole; a reactive force generator 230 that is vertically arranged with respect to the axial direction of the column 220; a solenoid 240 that is vertically coupled with the reactive force generator 230; and the like.

Here, the steering control apparatus 200 according to the present disclosure may further include the controller 160 illustrated in FIG. 1.

Referring to A illustrated in FIG. 2, the column 220 is arranged in one direction, and the reactive force generator 230 is vertically arranged on the axis of the column 220.

The column 220 may include a column shaft 221 that is in the form of a shaft and has one end with which the steering wheel 110 is coupled, a sensor 250 coupled with the other end of the column shaft 221, a worm wheel reduction gear 222 that is coupled with the other end of the column shaft 221 extending through the sensor 250 and is arranged in parallel with the sensor 250, and bearings 260.

The column shaft 221 can perform a telescopic operation of protruding or reducing in an axial direction in accordance with driver's selection or a setting of the controller 160.

The steering wheel 110 is coupled with one end of the column shaft 221.

The worm wheel reduction gear 222 may include one or more coupling grooves.

As illustrated in FIG. 2, the sensor 250 may be arranged between the column shaft 221 and the worm wheel reduction gear 222 but is not limited thereto.

The sensor 250 may be one sensor among the steering angle sensor 130, the steering wheel angle sensor 170, and the rotation speed sensor 180 illustrated in FIG. 1 or a sensor including all the three sensors.

However, the sensor is not limited thereto.

As illustrated in FIG. 2, the bearings may be configured as two bearings 260 but are not limited thereto, and the number of bearings is arbitrary.

As the arrangement of the bearings 260, as illustrated in FIG. 2, two bearings 260a and 260b may be directly connected to the column shaft 221 or may be arranged between the sensor 250 and the worm wheel reduction gear 222.

However, the arrangement thereof is not limited thereto.

Here, the column 20 may further include a stopper 223.

In a case in which the column shaft 221 extends through the worm wheel reduction gear 222, the stopper 223 may be coupled with the other end of the extending column shaft 221 and is arranged in parallel with the worm wheel reduction gear 222.

The stopper 223 moves in the axial direction of the column shaft 221 while rotating in accordance with the rotation of the column shaft 221.

While the stopper 223 rotates in one direction and moves in the axial direction of the column shaft 221 by a predetermined distance, it stops in accordance with physical coupling.

The stopper 223 similarly operates also in a case in which it rotates in a direction opposite to the one direction.

The stopper 223 stops in accordance with physical coupling while moving, whereby a maximum steering angle of the steering wheel 110 is physically determined.

Generally, the steering wheel 110 can rotate in one direction or in a direction opposite to the one direction by 1.5 turns in accordance with the stopper 223.

The reactive force generator 230 may include a worm shaft 233 coupled with the coupling grooves of the worm wheel reduction gear 222, a coupling bearing 232 coupled with one end of the worm shaft 233, a reaction motor 231 coupled with the other end of the worm shaft 233, and a clearance compensation mechanism 234 that is coupled with the shaft of the worm shaft 233 in parallel with the coupling bearing 232 and is disposed at a tip end of the worm shaft 233.

The coupling bearing 232 may include one or more coupling grooves.

The worm shaft 233 may include a protrusion formed in a spiral form on an outer circumferential face.

The solenoid 240 is disposed vertically with respect to the reactive force generator 230 as a whole and is arranged to be coupled with the coupling grooves of the coupling bearing 232 in accordance with a control signal of the controller 160.

The controller 160 may output a control signal operating the reaction motor 231, check the state of the vehicle, and output a turn-off signal and a turn-on signal controlling the solenoid 240 based on a result of the checking.

Here, the turn-off signal or the turn-on signal may correspond to a current causing the solenoid 240 to perform a coupling or decoupling operation for the coupling grooves of the coupling bearing 232.

Figure 3:
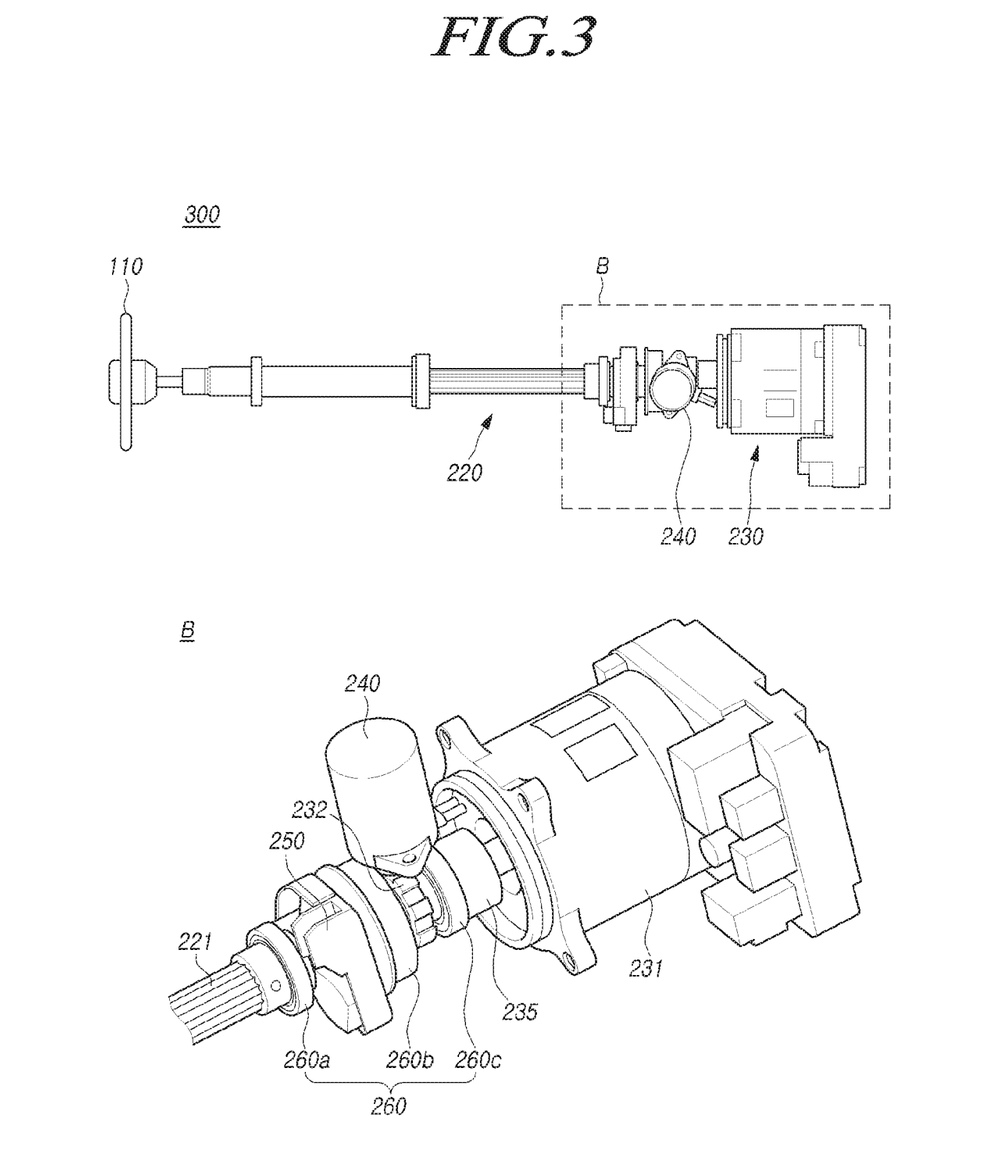
FIG. 3 is a diagram illustrating the structure of a steering control apparatus according to a second embodiment of the present disclosure.

FIG. 3 is a diagram illustrating the structure of a steering control apparatus 300 according to a second embodiment of the present disclosure.

Referring to FIG. 3, the steering control apparatus 300 according to the present disclosure may include: a steering wheel 110; a column 220 that has a columnar shape as a whole; a reactive force generator 230 that is arranged in an axial direction of the column 220 and is coupled with the other end of the column 220; a solenoid 240 that is vertically coupled with the column 220; and the like.

Here, the steering control apparatus 300 according to the present disclosure may further include the controller 160 illustrated in FIG. 1.

Referring to B illustrated in FIG. 3, the column 220 is arranged in one direction, and the reactive force generator 230 is coupled with a shaft of the column 220 in the axial direction.

The column 220 may include a column shaft 221 that is in the form of a shaft and has one end with which the steering wheel 110 is coupled, a sensor 250 coupled with the other end of the column shaft 221, bearings 260, and the like.

Here, the column 20 may further include a stopper (not illustrated) that is arranged at the other end of the column shaft 221 and is coupled through the shaft of the column shaft 221.

The reactive force generator 230 may include a coupling bearing 232 coupled with the other end of the column shaft 221 and includes one or more coupling grooves, a reaction motor 231 coupled with the other end of the column shaft 221 extending through the coupling bearing 232 and generates a reactive torque for the rotation of the steering wheel 110, and a coupler 235 used for coupling the column shaft 211 and the reactive force motor 231.

Since the structure of the steering control apparatus 300 illustrated in FIG. 3 is different from the structure of the steering control apparatus 200 illustrated in FIG. 2, the coupling bearing 232 included in the steering control apparatus 300 illustrated in FIG. 3 may be designed to have a larger size.

Similarly to the description presented above, the reaction motor 231 included in the steering control apparatus 300 illustrated in FIG. 3 may be designed to have a larger size and a larger capacity.

The solenoid 240 is disposed vertically with respect to the column 220 as a whole and is arranged to be coupled with the coupling grooves of the coupling bearing 232 in accordance with a control signal of the controller 160.

Similarly to the description presented above, the solenoid 240 included in the steering control apparatus 300 illustrated in FIG. 3 may be designed to have a larger outer diameter and a higher rigidity.

As the arrangement of the hearings 260 illustrated in FIG. 3, three bearings 260a, 260b, and 260c may be directly connected to the column shaft 221, may be arranged between the sensor 250 and the coupling bearing 223, or may be arranged between the coupling bearing 223 and the coupler 235.

Figure 4:
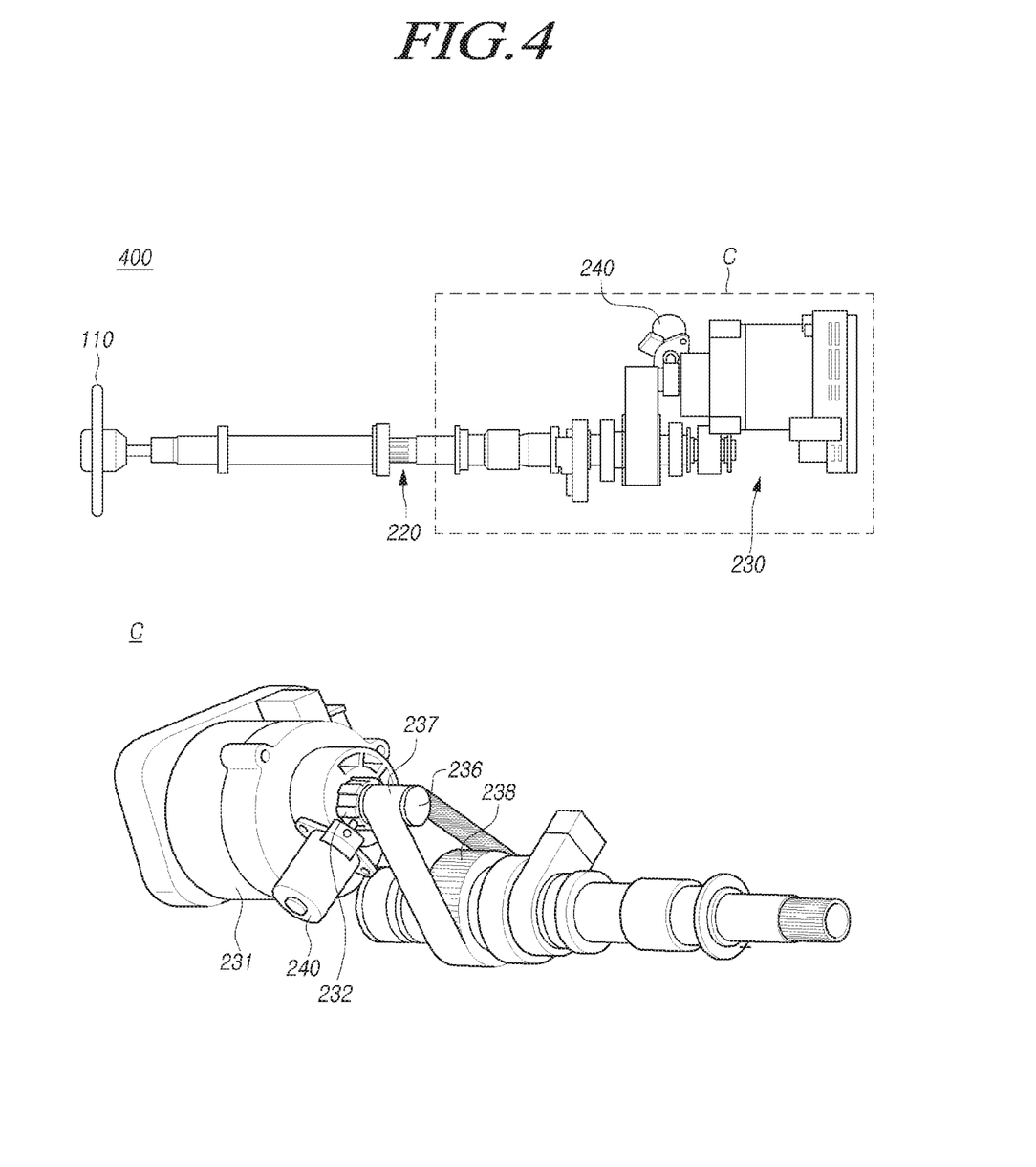
FIG. 4 is a diagram illustrating the structure of a steering control apparatus according to a third embodiment of the present disclosure.

FIG. 4 is a diagram illustrating the structure of a steering control apparatus 400 according to a third embodiment of the present disclosure.

Referring to FIG. 4, the steering control apparatus 400 according to the present disclosure may include: a steering wheel 110; a column 220 that has a columnar shape as a whole; a reactive force generator 230 that is arranged in an axial direction of the column 220 and is coupled with the other end of the column 220; a solenoid 240 that is vertically coupled with the column 220; and the like.

Referring to C illustrated in FIG. 4, the column 220 may include a column shaft having one end with which the steering wheel 110 is coupled, a first pulley 238 coupled with the other end of the column shaft, and a belt 237 connected to the first pulley 238.

Here, the column shaft illustrated in FIG. 4 may the same as the column shafts illustrated in FIGS. 2 and 4.

The first pulley 238 may be coupled with the other end of the column shaft through a hole formed on the inside thereof.

The shape of the first pulley 238 may be preferably a circular shape or a donut shape but is not limited thereto.

The belt 237 is engaged with the first pulley 238 and may move together in accordance with rotational movement of the first pulley 238.

The reactive force generator 230 may include a second pulley 236 connected to the belt 237, a coupling bearing 232 coupled with one end of the second pulley 236 and includes one or more coupling grooves, and a reaction motor 231 coupled with the coupling hearing 232 and generates a reactive torque for the rotation of the steering wheel 110.

The second pulley 236 may be engaged with the belt 237, and, preferably, the shape thereof may be a cylindrical shape but is not limited thereto.

The other end of the second pulley 236 may be coupled with the coupling bearing 232 through a hole formed inside the coupling bearing 232.

The reaction motor 231 and the coupling bearing 232 are similar to those described above with reference to FIGS. 2 and 3.

The solenoid 240, similar to that described with reference to FIGS. 2 and 3, may include a rod that can be coupled with coupling grooves and a housing connected to the rod.

Here, the steering control apparatus 400 according to the present disclosure, as described above with reference to FIGS. 1 to 3, may further include a controller 160.

As described above, the controller 160 checks a state of the vehicle and, based on a result of the checking, may output a turn-off signal for controlling such that the rod protrudes to the outside of the housing and is coupled with the coupling grooves or output a turn-on signal for controlling such that the rod enters the inside of the housing and is decoupled from the coupling grooves.

Figure 5:
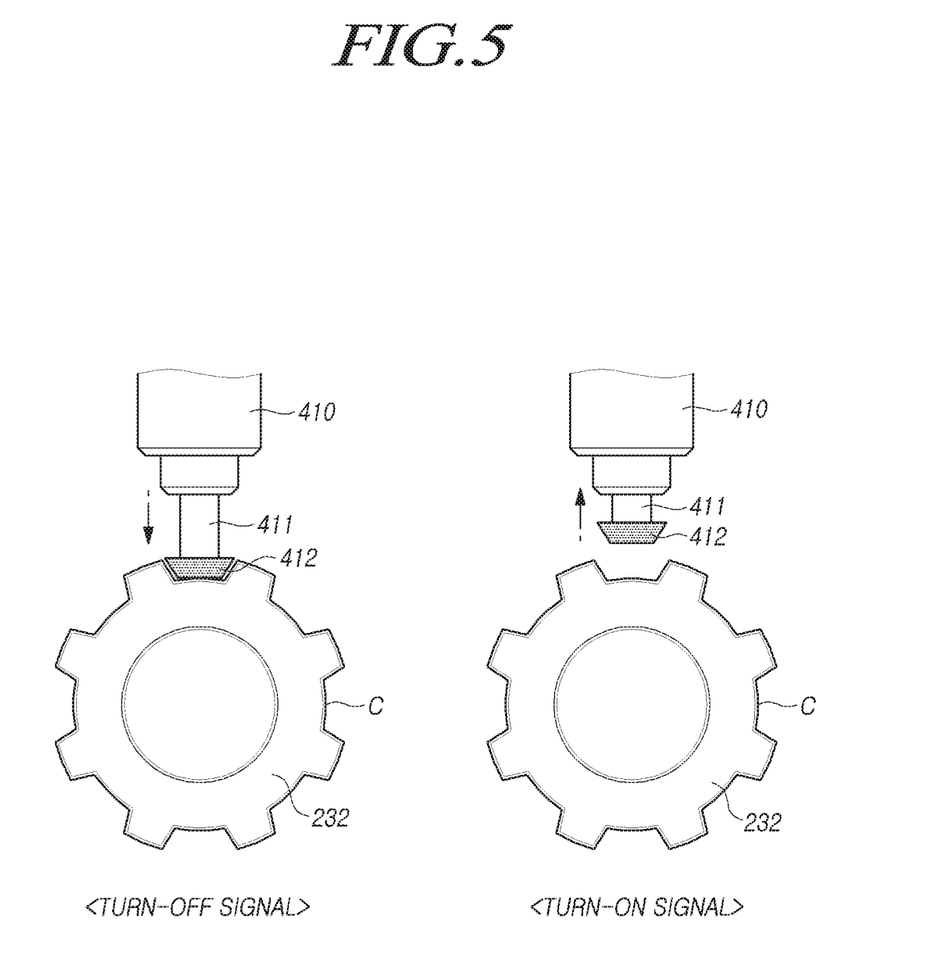
FIG. 5 is a diagram schematically illustrating an appearance in which a solenoid included in a steering control apparatus according to the present disclosure operates in accordance with a control signal of a controller.

FIG. 5 is a diagram schematically illustrating an appearance in which the solenoid 240 included in the steering control apparatus 200, 300, or 400 according to the present disclosure operates in accordance with a control signal of the controller 160.

Referring to FIG. 5, the solenoid 240 may include a housing 410, a rod 411, and the like.

The housing 410 may have a hollow cylindrical shape so that the rod 411 can be included therein.

However, the shape thereof is not limited thereto.

The rod 411 may be formed to have a rectangular rod structure but is not limited thereto.

The rod 411 may protrude to the outside of the housing 410 or may be inserted into the inside of the housing 410.

The rod 411 is inserted into a coupling groove C of the coupling bearing 232 and physically controls the movement of the coupling bearing.

For example, the rod 411 formed to have a rectangular rod shape protrudes to the outside of the housing 410 and may be inserted into the coupling groove C of the coupling bearing 232.

In order to be more firmly coupled with the coupling groove C of the coupling bearing 232, a tip end of the rod 411 may be formed in the same shape as that of the coupling groove C or a locking end 412 formed as a separate member may be coupled with the tip end of the rod 411.

At this time, the locking end 412 may be formed in the same shape as the shape of the coupling groove C such that it can be inserted into the coupling groove C of the coupling bearing 232.

One or more coupling grooves C may be formed on an outer circumferential face of the coupling bearing 232.

For example, the coupling grooves C may be formed to be arranged at constant intervals on the entire circumference of the outer circumferential face of the coupling bearing 232.

If the controller 160 checks the state of the vehicle and outputs a turn-off signal based on a result of the checking, the rod 411 protrudes to the outside of the solenoid 240 and is coupled with the coupling grooves C of the coupling bearing 232.

To the contrary, if the controller 160 checks the state of the vehicle and outputs a turn-on signal based on a result of the checking, the rod 411 enters the inside of the solenoid 240 and coupling with the coupling grooves C of the coupling bearing 232 is deactivated.

As described above, the controller 160 checks the state of the vehicle and controls the solenoid 240 based a result of the checking.

Here, the state of the vehicle, for example, may include a state in which the steering of a vehicle traveling at a high speed needs to be controlled, a state in which the vehicle is engaged with an obstacle, and it is difficult for the vehicle to travel, a state in which some devices of the vehicle malfunction, and the like.

Hereinafter, a method of controlling the solenoid 240 of the controller 160 will be described in accordance with the states of the vehicle as specific examples.

Figure 6:
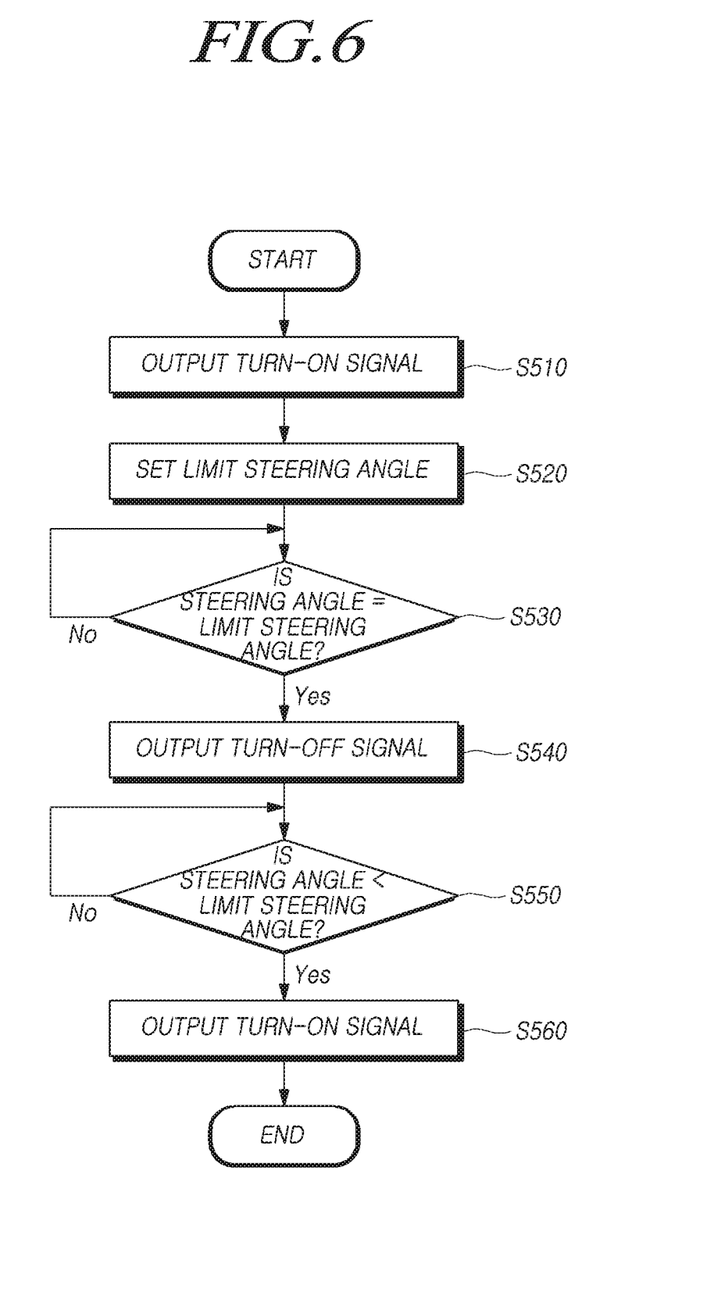
FIG. 6 is a diagram illustrating a first operating method for a controller included in a steering control apparatus according to the present disclosure.

FIG. 6 is a diagram illustrating a first operating method for the controller 160 included in the steering control apparatus 200, 300, or 400 according to the present disclosure.

In order to prepare for an urgent situation that may occur during traveling, a driver may arbitrarily set a maximum steering angle of the steering wheel.

Referring to FIG. 6, the controller 160 outputs a turn-on signal such that the vehicle is steered by the driver (S510).

If the turn-on signal is output, the rod 411 included in the solenoid 240 is inserted into the inside of the housing 410 and is decoupled from the coupling grooves of the coupling bearing 232.

The controller 160 sets a limit steering angle (S520).

The limit steering angle represents a rotation angle when the steering wheels 110 cannot rotate in one direction any more after rotating in the one direction.

The limit steering angle is a rotation angle when the steering wheel 110 cannot rotate in one direction and thus is similar to a maximum steering angle designed to physically stop the rotation of the steering wheel 110 using a stopper or the like.

The limit steering angle is a value that is arbitrarily set by a driver or the controller 160.

In addition, the limit steering angle may be set while the vehicle is traveling or stops.

The limit steering angle is a value that can be arbitrarily set and thus may be a value equal to or smaller than the maximum steering angle described above.

For example, if the steering wheel 110 can rotate by 1.5 turns in one direction or in a direction opposite to the one direction due to the stopper 223, as a result of conversion of 1.5 turns into an angle, the maximum steering angle of the steering wheel 110 is 540 degrees, and the limit steering angle may be 360 degrees (if converted into the number of turns, one turn) smaller than 540 degrees.

The controller 160 receives steering angle information from the steering angle sensor 130 and determines whether or not the steering angle of the steering wheel 110 corresponds to the set limit steering angle (S530).

In a case in which the steering angle of the steering wheel 110 corresponds to the limit steering angle, the controller 160 outputs a turn-off signal (S540).

If the turn-off signal is output, the rod 411 included in the solenoid 240 protrudes to the outside of the housing 410 and is coupled with coupling grooves of the coupling bearing 232.

If the rod 411 and the coupling grooves are coupled with each other, the steering wheel 110 cannot rotate any more in the one direction.

The controller 160 determines whether or not the steering angle of the steering wheel 110 corresponds to the limit steering angle.

For example, the controller 160 determines whether or not the steering angle of the steering wheel 110 is smaller than the limit steering angle (S550).

In a case in which the steering angle of the steering wheel 110 does not correspond to the set limit steering angle, the controller 160 outputs a turn-on signal.

For example, if the steering wheel 110 rotates in a direction opposite to the one direction, the steering angle of the steering wheel 110 may have a value smaller than the limit steering angle.

At this time, the controller 160 outputs a turn-on signal (S560).

Figure 7:
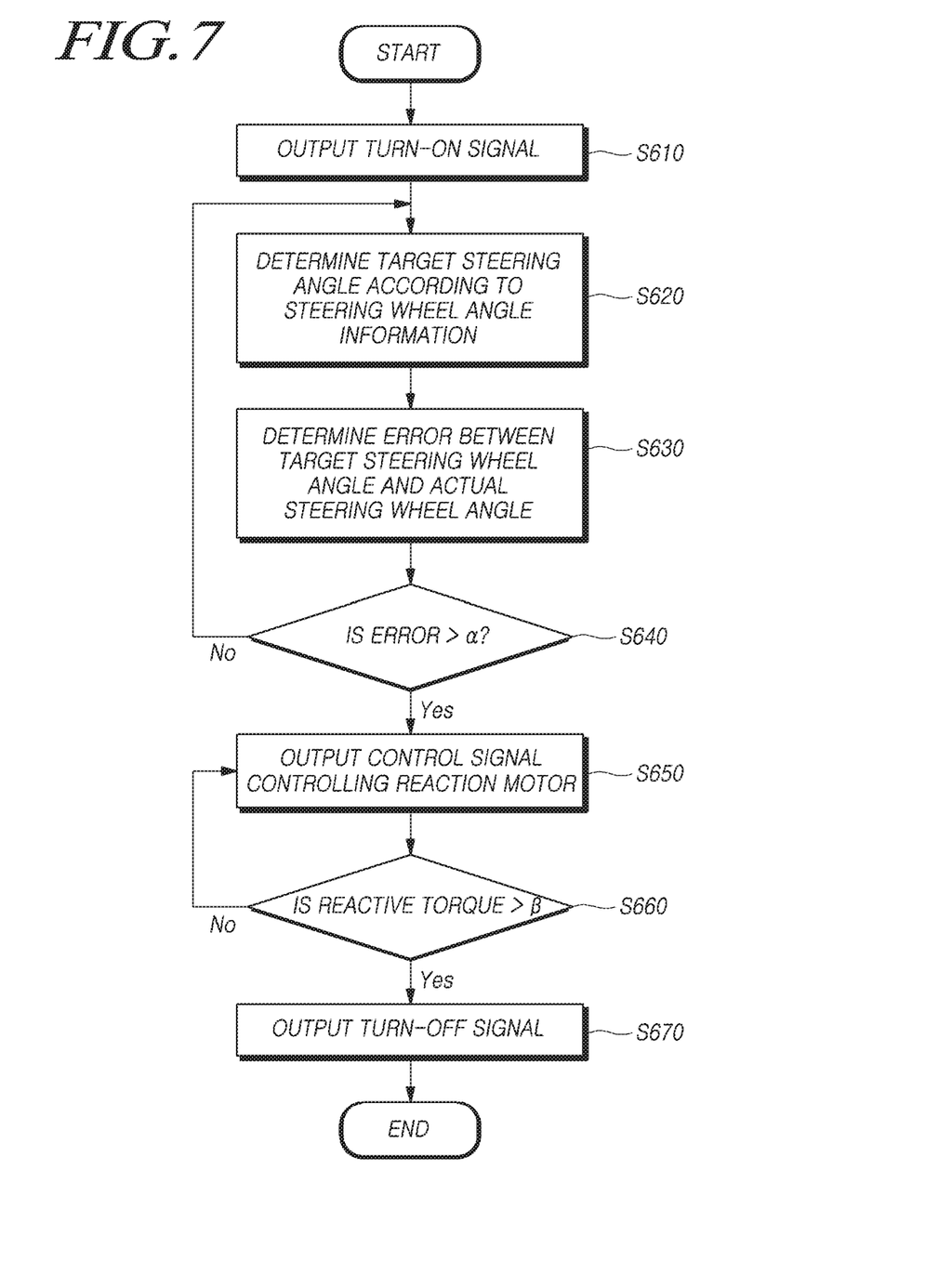
FIG. 7 is a diagram illustrating a second operating method for a controller included in a steering control apparatus according to the present disclosure.

FIG. 7 is a diagram illustrating a second operating method for a controller included in the steering control apparatus 200, 300, or 400 according to the present disclosure.

The controller 160 may operate in a fail-safety situation.

For example, a malfunction of a device included in a steering system of a vehicle may occur.

At this time, in order to prevent a safety accident, the controller 160 may control the rotation of the steering wheel 110.

In addition, the controller 160 may operate in a case in which the wheel 197 of the vehicle is engaged with an obstacle and is not steered during traveling.

Referring to FIG. 7, the controller 160 outputs a turn-on signal such that the vehicle is steered by the driver (S610).

If the turn-on signal is output, the rod 411 included in the solenoid 240 is inserted into the inside of the housing 410 and is decoupled from the coupling grooves of the coupling bearing 232.

The controller 160 receives steering angle information relating to a steering angle of the steering wheel 110 from the steering angle sensor 130.

The controller 160 determines a target steering wheel angle according to the steering angle information (S620).

The target steering wheel angle represents a steering wheel angle of the wheels 197 that is theoretically determined when the wheels 197 normally operate to the left side or the right side in correspondence with the steering angle of the steering angle 110.

A method of calculating a target steering wheel angle may be a method that is realized by a numerical equation and software such as an algorithm and logics designed in advance in accordance with the traveling status of the vehicle.

However, the method is not limited thereto.

The steering wheel angle information of the wheels is received from the steering wheel angle sensor 170, and an error between the target steering wheel angle and the steering wheel angle of the wheels is determined (S630).

The controller 160 determines whether or not the determined error deviates from an error range α set in advance in accordance with a traveling status, a traveling environment, and the like of the vehicle (S640).

In a case in which the error deviates from the predetermined error range α, the controller 160 outputs a control signal for controlling the reaction motor 231 such that the reaction motor 231 generates a reactive torque corresponding to the error (S650).

The reaction motor 231 is driven and generates a reactive torque in accordance with a control signal of the controller 160, and the driver feels a reactive sense in accordance with the generated reactive torque.

The reaction motor 231 continuously generates a reactive torque corresponding to an error, and the controller 160 may determine control of the solenoid such that the driver feels a strong reactive sense at a specific limit point.

More specifically, the controller 160 comprehensively receives information of a reactive torque generated by the reaction motor 231, the steering angle information relating to the steering angle of the steering wheel 110, the steering wheel angle information relating to a steering wheel angle actually steered by the wheels 197, and the like and determines whether or not the reactive torque is equal to or higher than a limit value β set in advance (S660).

The limit value β set in advance may be determined through an algorithm or a simulation.

For example, the limit value β may be a value determined through a simulation such that a driver feels a reactive sense of about 18 Nm.

In a case in which the reactive torque is equal to or smaller than the limit value β set in advance, the controller 160 continuously outputs a control signal for controlling the reaction motor (S650).

On the other hand, in a case in which the active torque is larger than the limit value β set in advance, the controller 160 outputs a turn-off signal (S670).

If the turn-off signal is output, the rod 411 included in the solenoid 240 protrudes to the outside of the housing 410 and is coupled with the coupling grooves of the coupling bearing 232.

Figure 8:
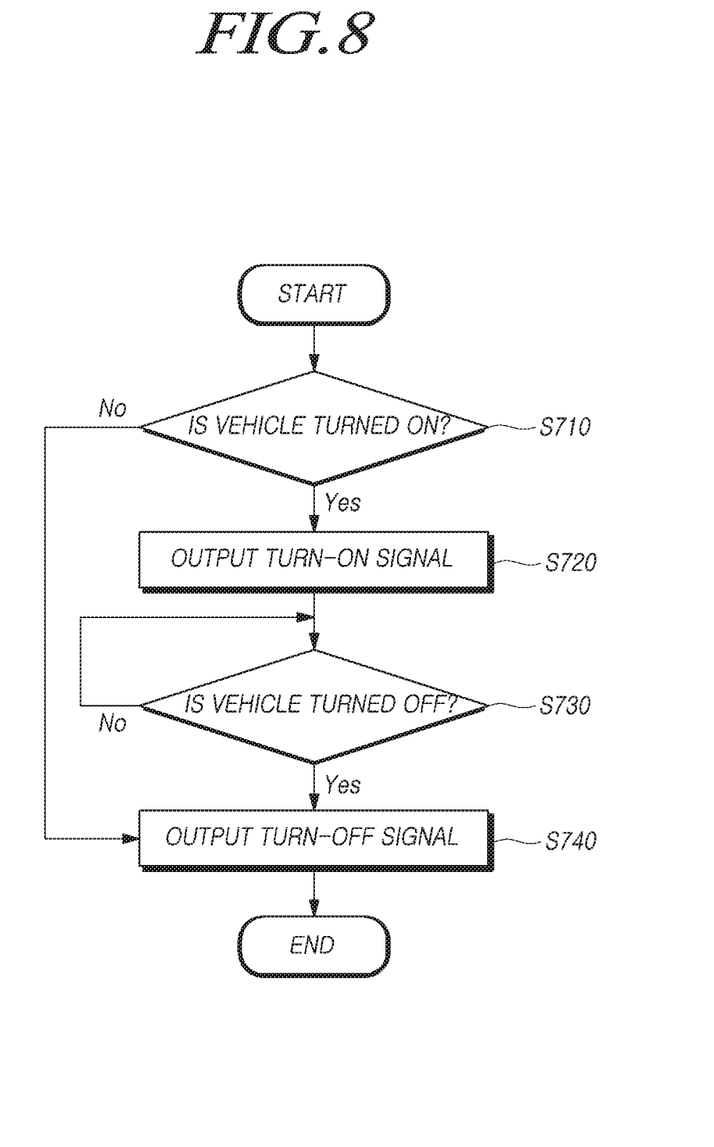
FIG. 8 is a diagram illustrating a third operating method for a controller included in a steering control apparatus according to the present disclosure.

FIG. 8 is a diagram illustrating a third operating method for the controller 160 included in the steering control apparatus 200, 300, or 400 according to the present disclosure.

The controller 160 may determine whether or not the vehicle is turned on by a driver and control the steering of the steering wheel 110.

Referring to FIG. 8, the controller 160 determines whether or not the vehicle is turned on (start on) (S710).

Here, whether or not the vehicle is turned on, for example, may be checked by the controller 160 directly receiving a power signal.

As another example, if a passenger presses a power button, a sensor detects the pressing and inputs a power signal to the controller 160, whereby it can be checked whether or not the vehicle is turned on.

In a case in which the vehicle is turned on, the controller 160 outputs a turn-on signal (S720).

The controller 160 determines whether or not the vehicle is turned off (start off) (S730).

In a case in which the vehicle is turned off, the controller 160 outputs a turn-off signal (S740).

As described above, according to the present disclosure, a steering control apparatus capable of providing a sufficient reactive sense for a driver without increasing the size and the capacity of the reaction motor can be provided.

In addition, according to the present disclosure, a steering control apparatus enabling a decrease in the weight of a vehicle by decreasing the size and the capacity of the reaction motor can be prevented.

Furthermore, according to the present disclosure, a steering control apparatus performing control for preventing a driver's unstable steering wheel operation for a steering wheel system of an abnormal vehicle can be provided.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

REFERENCE SIGNS LIST

100: steering system
110: steering wheel
120, 220 column
130: steering angle sensor
140, 240 solenoid
150, 231: reaction motor
160: controller
170: steering wheel angle sensor
180: rotation speed sensor
191: drive motor
192: pinion gear
193: rack gear
194: rack bar
195: tie rod
196: knuckle arm
197: wheel
200, 300: steering control apparatus
221: column shaft
222: worm wheel reduction gear
223: stopper
230: reactive force generator
232: coupling bearing
233: worm shaft
234: clearance compensation mechanism
235: coupler
250: sensor
260: bearing
410: housing
411: rod
412: locking end

What is claimed is:

1. A steering control apparatus comprising:
a steering wheel;
a column including a column shaft having one end with which the steering wheel is coupled and a worm wheel reduction gear that is coupled with the other end of the column shaft and includes one or more first coupling grooves;
a reactive force generator that includes a worm shaft engaged with the first coupling grooves, a coupling bearing coupled with one end of the worm shaft and including one or more second coupling grooves, and a reaction motor coupled with the other end of the worm shaft and generating a reactive torque for rotation of the steering wheel;
a solenoid including a rod that can be coupled with the second coupling grooves and a housing that is connected to the rod; and a controller that checks a state of a vehicle and outputs a turn-off signal performing control such that the rod protrudes to the outside of the housing and is coupled with the second coupling grooves or a turn-on signal performing control such that the rod enters the inside of the housing and is decoupled from the second coupling grooves based on a result of checking.

2. The steering control apparatus according to claim 1, further comprising a steering angle sensor that detects a steering angle of the steering wheel,
wherein the controller sets a limit steering angle, receives steering angle information from the steering angle sensor, outputs the turn-off signal in a case in which the steering angle corresponds to the limit steering angle, and outputs the turn-on signal in a case in which the steering angle does not correspond to the limit steering angle.

3. The steering control apparatus according to claim 1, further comprising a steering angle sensor that detects a steering angle of the steering wheel and a steering wheel angle sensor that detects a steering wheel angle of wheels,
wherein the controller receives steering angle information from the steering angle sensor and determines a target steering wheel angle according to the steering angle information, receives steering wheel angle information from the steering wheel angle sensor and determines an error between the target steering wheel angle and the steering wheel angle, outputs the turn-off signal in a case in which the error deviates from a predetermined error range set in advance, and outputs the turn-on signal in a case in which the error is included within the error range.

4. The steering control apparatus according to claim 1,
wherein the controller receives target speed information of the vehicle and rotation speed information relating to a rotation speed of the wheels from a rotation speed sensor, outputs the turn-off signal in a case in which the rotation speed of the wheels does not correspond to the target speed, and outputs the turn-on signal in a case in which the rotation speed of the wheels corresponds to the target speed.

5. The steering control apparatus according to claim 1,
wherein the controller determines whether or not the vehicle is turned on, outputs the turn-on signal in a case in which the vehicle is turned on, and outputs the turn-off signal in a case in which the vehicle is turned off.

6. The steering control apparatus according to claim 1,
wherein the column further includes a stopper that is coupled with the other end of the column shaft extending through the worm wheel reduction gear and is arranged in parallel with the worm wheel reduction gear.

7. A steering control apparatus comprising:
a steering wheel;
a column shaft having one end with which the steering wheel is coupled;
a reactive force generator including a coupling bearing that is coupled with the other end of the column shaft and includes one or more coupling grooves and a reaction motor that is coupled with the other end of the column shaft extending through the coupling bearing and generates a reactive torque for rotation of the steering wheel;
a solenoid including a rod that can be coupled with the coupling groove and a housing connected to the rod; and a controller that checks a state of a vehicle and, based on a result of the checking, outputs a turn-off signal performing control such that the rod protrudes to the outside of the housing and is coupled with the coupling groove of the coupling bearing or a turn-on signal performing control such that the rod enters the inside of the housing and is decoupled from the coupling groove of the coupling bearing.

8. The steering control apparatus according to claim 7, further comprising a steering angle sensor that detects a steering angle of the steering wheel,
wherein the controller sets a limit steering angle, receives steering angle information from the steering angle sensor, outputs the turn-off signal in a case in which the steering angle corresponds to the limit steering angle, and outputs the turn-on signal in a case in which the steering angle does not correspond to the limit steering angle.

9. The steering control apparatus according to claim 7, further comprising a steering angle sensor that detects a steering angle of the steering wheel and a steering wheel angle sensor that detects a steering wheel angle of wheels,
wherein the controller receives steering angle information from the steering angle sensor and determines a target steering wheel angle according to the steering angle information, receives steering wheel angle information from the steering wheel angle sensor and determines an error between the target steering wheel angle and the steering wheel angle, outputs the turn-off signal in a case in which the error deviates from a predetermined error range set in advance, and outputs the turn-on signal in a case in which the error is included within the error range.

10. The steering control apparatus according to claim 7,
wherein the controller receives target speed information of the vehicle and rotation speed information relating to a rotation speed of the wheels from a rotation speed sensor, outputs the turn-off signal in a case in which the rotation speed of the wheels does not correspond to the target speed, and outputs the turn-on signal in a case in which the rotation speed of the wheels corresponds to the target speed.

11. The steering control apparatus according to claim 7,
wherein the controller determines whether or not the vehicle is turn on, outputs the turn-on signal in a case in which the vehicle is turned on, and outputs the turn-off signal in a case in which the vehicle is turned off.

12. A steering control apparatus comprising:
a steering wheel;
a column including a column shaft having one end with which the steering wheel is coupled, a first pulley coupled with the other end of the column shaft, and a belt connected to the first pulley;
a reactive force generator including a second pulley that is connected to the belt, a coupling bearing that is coupled with one end of the second pulley and includes one or more coupling grooves, and a reaction motor that is coupled with the coupling bearing and generates a reactive torque for rotation of the steering wheel;
a solenoid including a rod that can be coupled with the coupling groove and a housing that is connected to the rod; and
a controller that checks a state of a vehicle and outputs a turn-off signal performing control such that the rod protrudes to the outside of the housing and is coupled with the second coupling grooves or a turn-on signal performing control such that the rod enters the inside of the housing and is decoupled from the second coupling grooves based on a result of checking.

\* \* \* \* \*